United States Patent
Suematsu (10) Patent No.: US 7,971,671 B2
(45) Date of Patent: Jul. 5, 2011

(54) DRIVE UNIT, HYDRAULIC WORKING MACHINE, AND ELECTRIC VEHICLE

(76) Inventor: Mitsuru Suematsu, Tomi (JP)

( * ) Notice: Subject to any disclaimer, the term of this patent is extended or adjusted under 35 U.S.C. 154(b) by 429 days.

(21) Appl. No.: 12/304,150

(22) PCT Filed: Jun. 20, 2006

(86) PCT No.: PCT/JP2006/312314
§ 371 (c)(1),
(2), (4) Date: Dec. 10, 2008

(87) PCT Pub. No.: WO2007/148382
PCT Pub. Date: Dec. 27, 2007

(65) Prior Publication Data
US 2009/0183932 A1  Jul. 23, 2009

(51) Int. Cl.
*B60K 1/00* (2006.01)
(52) U.S. Cl. ............... 180/65.31; 429/524; 429/526; 429/528; 429/530; 429/533; 502/102; 502/103; 502/185; 502/326; 502/339
(58) Field of Classification Search ............... 180/65.31; 429/523, 524, 526, 528, 530, 532, 533, 484, 429/486, 487; 502/102, 103, 174, 185, 325, 502/326, 339, 261
See application file for complete search history.

(56) References Cited

U.S. PATENT DOCUMENTS

| 6,541,150 | B1 | 4/2003 | Xie et al. |
| 7,488,547 | B1 * | 2/2009 | Iacovelli ............... 429/434 |
| 2004/0136211 | A1 | 7/2004 | Itou | |

FOREIGN PATENT DOCUMENTS

| JP | 11-061883 A | 3/1999 |
| JP | 2001-043865 A | 2/2001 |
| JP | 2003-109608 A | 4/2003 |
| JP | 2003-168452 A | 6/2003 |
| JP | 2004-222376 A | 8/2004 |
| JP | 2004-342534 A | 12/2004 |
| JP | 2005-019303 A | 1/2005 |
| JP | 2006-019261 A | 1/2006 |

OTHER PUBLICATIONS

International Search Report for PCT/JP2006/312314, completed Sep. 28, 2006.

* cited by examiner

*Primary Examiner* — Jeffrey J Restifo
*Assistant Examiner* — Erez Gurari
(74) *Attorney, Agent, or Firm* — Buchanan Ingersoll & Rooney PC (57) ABSTRACT

A drive unit (1) for driving a hydraulic pump has an electric motor (2) for driving the hydraulic pump (100) of a construction working machine and also has a generator (3) for supplying electricity to the electric motor (2). A generation module (14) of the generator (3) has a structure where a large number of electrode assemblies (42) are serially connected between fastening plates (41) in a condition that partition plates (44) are sandwiched between the respective electrode assemblies (42). Liquid fuel for generating hydrogen and air are supplied to the electrode assemblies (42) to generate electric power. Unlike the case where the hydraulic pump (100) is driven by a diesel engine etc., the hydraulic pump drive unit has a low noise level and emits no exhaust gas, so that the device is extremely advantageous to reduce noise and exhaust gas of a construction working machine.

12 Claims, 7 Drawing Sheets

14: POWER GENERATOR MODULE
16: BLOWER
18: INTERNAL POWER SOURCE
23: CIRCULATION TANK
28: TANK
30: RECOVERY TANK
35: RELAY

DRIVE UNIT, HYDRAULIC WORKING MACHINE, AND ELECTRIC VEHICLE

TECHNICAL FIELD

The present invention relates to a drive unit that has a low noise level, does not emit exhaust gas, and is suitable for use in a hydraulic backhoe or other construction working machine or other hydraulic working machines, electric vehicles, and the like.

BACKGROUND ART

A construction working machine such as a front-end loader for digging holes or the like in residential or other areas is a hydraulic vehicle, and is constructed so that a hydraulic pump of a hydraulic drive mechanism is driven by a gasoline engine or a diesel engine to generate operating hydraulic pressure. Hydraulic working machines are often limited to nighttime use in residential and other areas due to engine noise.

Furthermore, working machines and vehicles driven by gasoline engines or diesel engines emit carbon dioxide. Air pollution from exhaust gas is currently a global issue and is a problem that requires an urgent resolution.

Therefore, it has been suggested that a hydraulic pump be driven using an electric motor in order to address the noise issue and to avoid air pollution from exhaust gas. However, a small-size, high-output power source suitable for mounting on a working machine is not currently available.

DISCLOSURE OF THE INVENTION

In view of this situation, an object of the present invention is to provide a drive unit having a built-in small-size, high-output power generator suitable for mounting in a hydraulic working machine, electric vehicle, or other vehicle.

Aimed at attaining the stated object, the drive unit of the present invention is characterized in having:

an electric motor; and a power generator for supplying electric power to the electric motor;

wherein the power generator is provided with a power generator module, a fuel supply component for supplying liquid fuel for hydrogen generation to the power generator module, and an air supply component for supplying air to the power generator module;

wherein the power generator module is provided with a power generator module structured so that an anode-side electrode plate supplied with the liquid fuel and a cathode-side electrode plate supplied with hydrogen contained in the air are disposed facing each other, an electrolyte membrane being sandwiched between the electrode plates;

wherein the anode-side electrode plate is an electrode plate in which platinum is supported on a sintered body of a microparticulate powder made of zeolite, coral sand, and carbon black; and wherein the cathode-side electrode plate is an electrode plate in which ruthenium is supported on a sintered body of a microparticulate powder made of zeolite and carbon black.

According to experiments conducted by the present inventors, it has been confirmed that the hydrogen contained in the liquid fuel supplied to the anode-side electrode plate undergoes efficient oxidative decomposition in a power generator module using such electrode plates, ensuring that power can be generated efficiently at normal temperature. It is therefore possible to efficiently generate power by a simple structure without using methanol or other fuel gases as in the past.

The power generator module in the present invention is provided with a pair of collector plates, a plurality of partition plates, and a plurality of electrode assemblies. The electrode assemblies are stacked and bonded structures in which an electrolyte film is sandwiched between the anode-side electrodes and the cathode-side electrodes. The electrode assemblies sandwich the partition plates and are serially connected. The electrode assemblies positioned on both edges sandwich the corresponding partition plates and are connected to the collector plates. Furthermore, each of the partition plates is provided with an anode-side face in which a fuel supply groove is formed, a cathode-side face in which an air supply groove is formed, an external circumferential end face in which an air intake is formed, and a fuel supply port passing in the thickness direction of the corresponding partition plate in an area disposed at a distance from the formation region of the fuel supply groove and the air supply groove. The air intake communicates with the air supply groove via an air duct formed in the interior of the partition plate; and the fuel supply port communicates with the fuel supply groove via a fuel duct formed in the interior of the partition plate. Fuel supply ports passing in the thickness direction in an area that corresponds to the fuel supply ports of the partition plates are formed in the electrode assemblies and the collector plates in a corresponding manner; the partition plates are stacked while disposed opposite the anode-side face in the anode-side electrode plates of the electrode assemblies; and the partition plates are stacked while disposed opposite the cathode-side face in the cathode-side electrode plates.

In this arrangement, the electrode assemblies and the partition plates can be bonded in a liquid-tight state by being stacked with interposed frame gaskets. In this case, each of the frame gaskets may be provided with a fuel supply port passing in the thickness direction of the frame gasket in an area corresponding to the fuel supply port.

Increasing the number of electrode assemblies in the power generator module thus configured allows power generation capacity can be increased in a simple manner.

Next, the hydraulic working machine of the present invention is characterized in having a hydraulic drive mechanism provided with a hydraulic pump, and a drive unit for driving the hydraulic pump, the drive unit having the aforementioned construction being used as the drive unit. A hydraulically driven working machine that has a low noise level and does not emit exhaust gas can be implemented because the hydraulic pump is driven by the electric motor and because a small-size power generator that capable of delivering a high output is used as the power source of the electric motor.

Furthermore, the electric vehicle of the present invention is characterized in being equipped with a drive unit having the aforementioned construction.

BEST MODE FOR CARRYING OUT THE INVENTION

Embodiments will now be described with reference to drawings for a case in which the drive unit of the present invention is adopted as a drive unit for a hydraulic working machine.

(Overall Structure)

Figure 1:
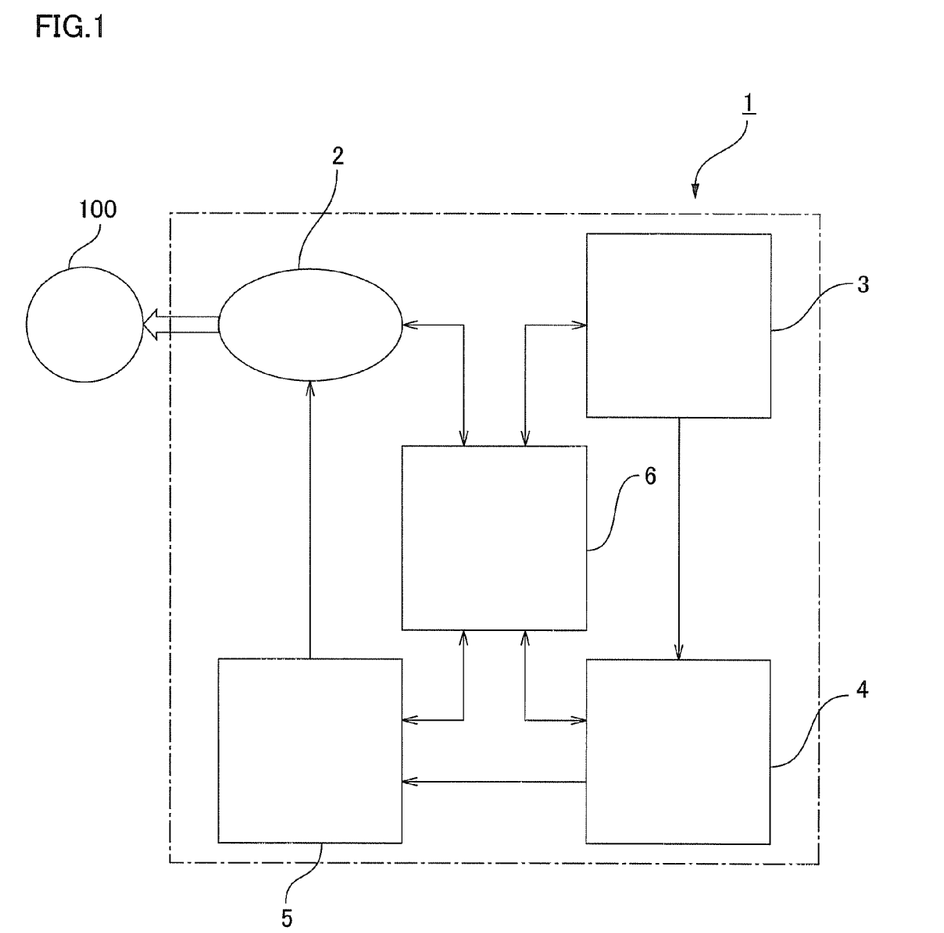
FIG. 1 is a schematic block diagram showing a drive unit for the hydraulic pump of a working machine to which the present invention has been applied.

FIG. 1 is a schematic block diagram of a drive unit for a hydraulic pump. The drive unit 1 of the present example is a unit for driving, for example, the hydraulic pump 100 of a backhoe or other hydraulic construction working machine, and is provided with an electric motor 2, a power generator 3 for supplying power to the electric motor 2, and a battery 4 for storing the electric current generated by the power generator 3. Power is supplied to the electric motor 2 via a capacitor 5. The parts 2, 3, 4, 5 are drivably controlled by a controller 6. The controller 6 is usually constructed as a part of a controller for drivably controlling a working machine on which the drive unit 1 is mounted.

Figure 2:
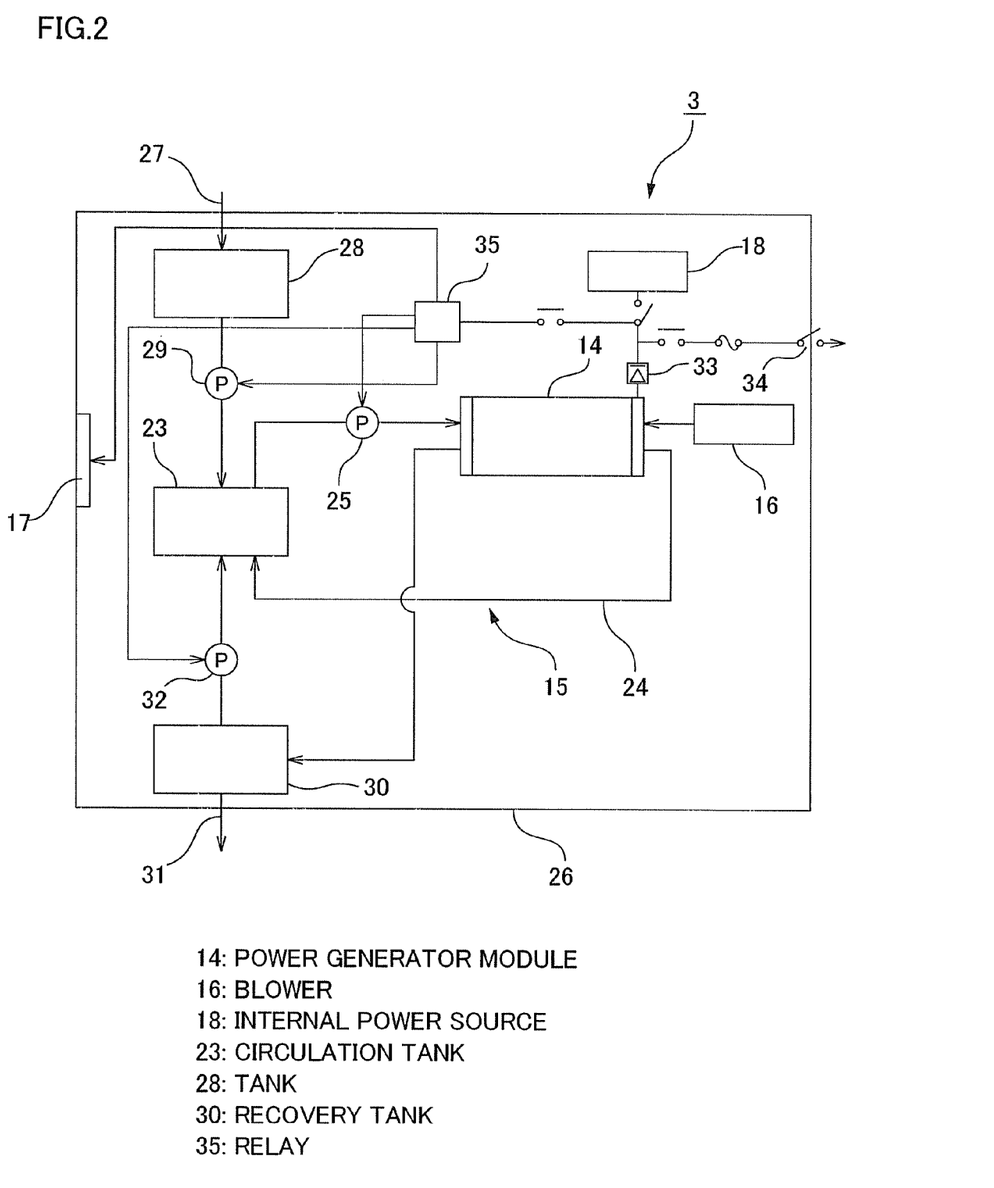
FIG. 2 is a schematic block diagram showing the power generator of FIG. 1.

FIG. 2 is a schematic block diagram showing the power generator 3. The power generator 3 comprises a power generator module 14, a fuel circulation system 15 for supplying liquid fuel for hydrogen generation to the power generator module 14, a blower 16 for supplying air (oxygen) to the power generator module 14, a cooling fan 17 for cooling the interior of the generator, and an internal power source 18 for driving the blower 16, the cooling fan 17, and the pump of the fuel circulation system 15.

The liquid fuel is a fuel having high hydrogen generation efficiency and can be a product obtained by dissolving 2 to 5 wt % organic material in 95 to 98 wt % purified water. Purified oil of citrus fruits or other plants, fermented alcohol from corn or other grains, or the like may be used as the organic material. A liquid fuel (trade name: Zumie fuel) manufactured and sold by the applicant of the present application is particularly preferred.

The fuel circulation system 15 of the power generator 3 comprises a circulation tank 23, a fuel circulation circuit 24 for circulating the liquid fuel stored in the circulation tank 23 via the power generator module 14, and a circulation pump 25 for circulating the liquid fuel along the fuel circulation circuit 24. Also provided is a main tank 28 capable of supplying liquid fuel through an injection port 27 positioned in a generator housing 26. When the amount of liquid fuel inside the circulation tank 23 is equal to or less than a prescribed amount, a supply pump 29 is driven, and the liquid fuel is replenished from the main tank 28 into the circulation tank 23.

The fuel circulation system 15 is provided with a recovery tank 30, and the liquid fuel recovered along with the air from the power generator module 14 is collected in the recovery tank 30. The liquid fuel collected in the recovery tank 30 is discharged as needed through a water discharge outlet 31 positioned in the generator housing 26. Furthermore, the liquid fuel recovered in the recovery tank 30 can be returned to the circulation tank 23 by a supply pump 32.

The DC current generated by the power generator module 14 is outputted to the internal power source 18 and the battery 4 via a rectifier 33. A startup switch 34 is positioned in a circuit for supplying power to the battery 4, and when the startup switch 34 is switched on, power is supplied from the internal power source 18 to the pumps 25, 29, 32, the blower 16, and the cooling fan 17 via a relay 35, and an operation is started in which these components are driven. Supply of generated current to the battery 4 is started after the power generation of the power generator module 14 is stabilized.

(Power Generation Module)

Figure 3:
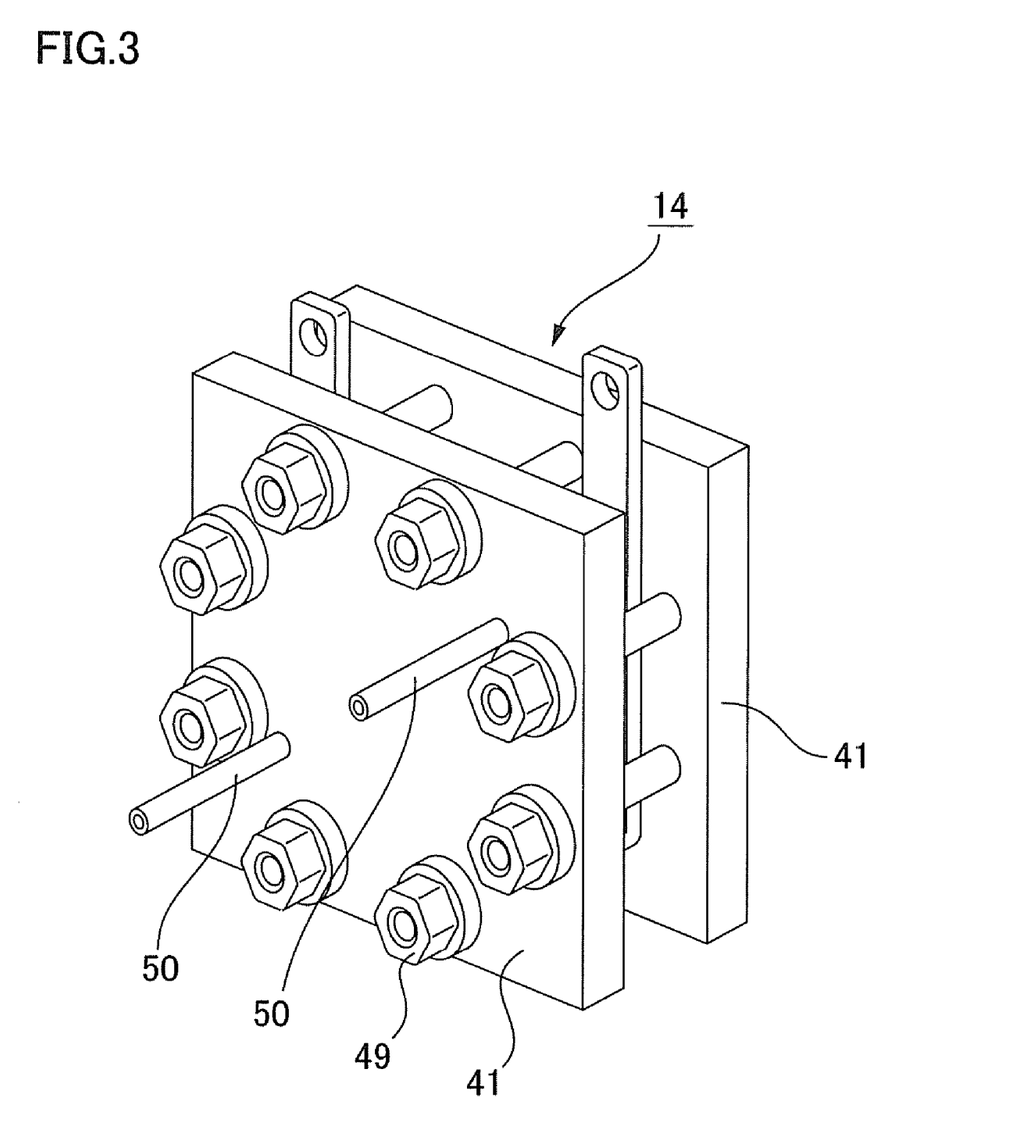
FIG. 3 is a perspective view showing a power generator module of the power generator of FIG. 2.
Figure 4:
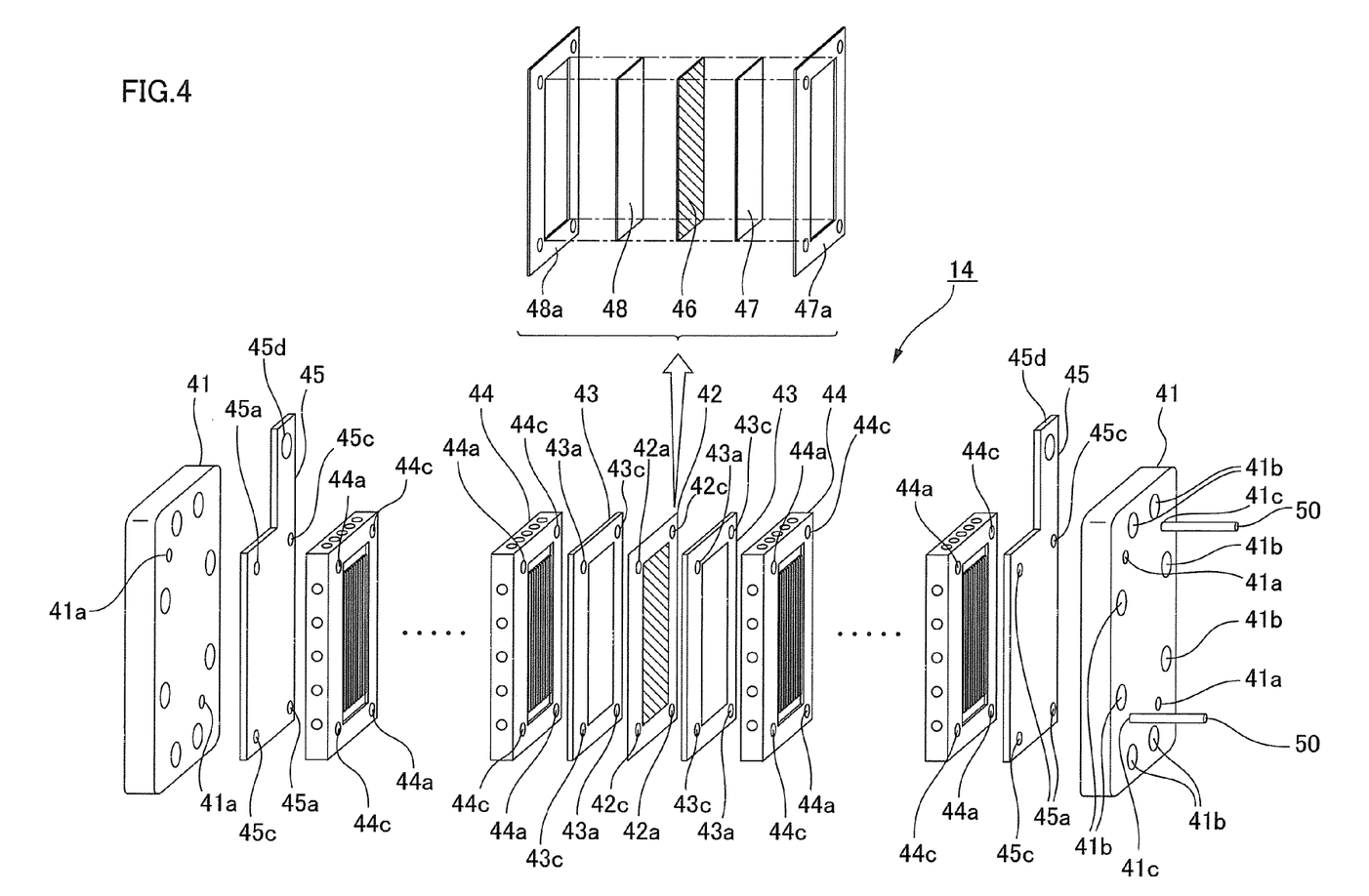
FIG. 4 is an exploded perspective view showing the power generator module of FIG. 3.
Figure 5:
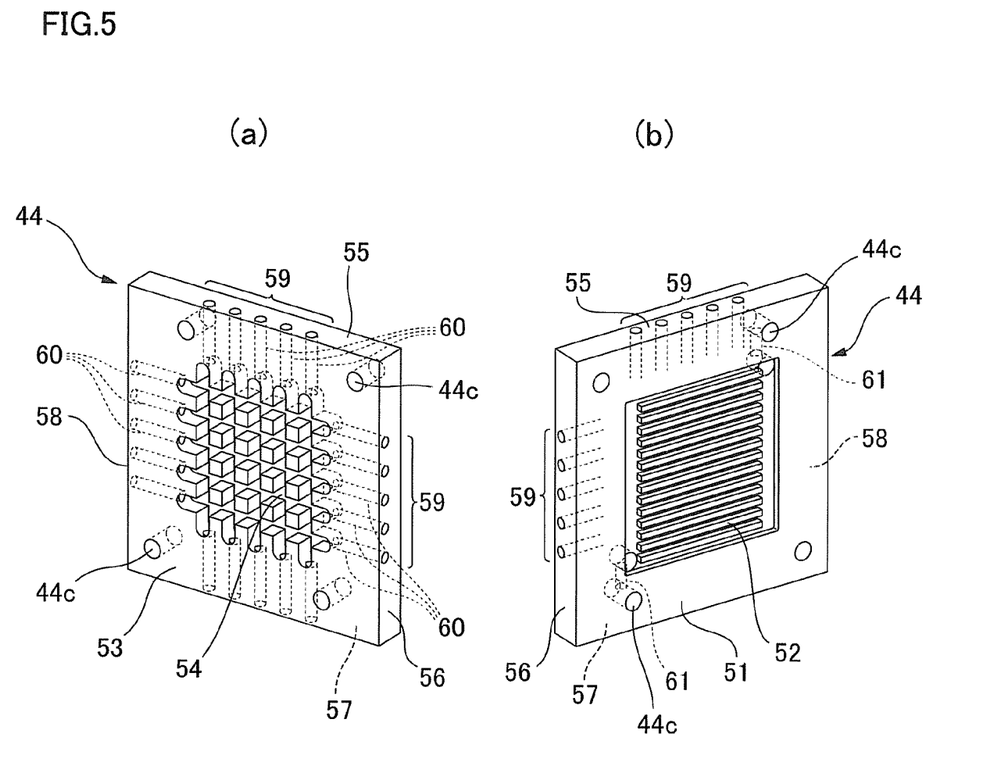
FIG. 5 is a perspective view showing the partition plate of FIG. 4.
Figure 6:
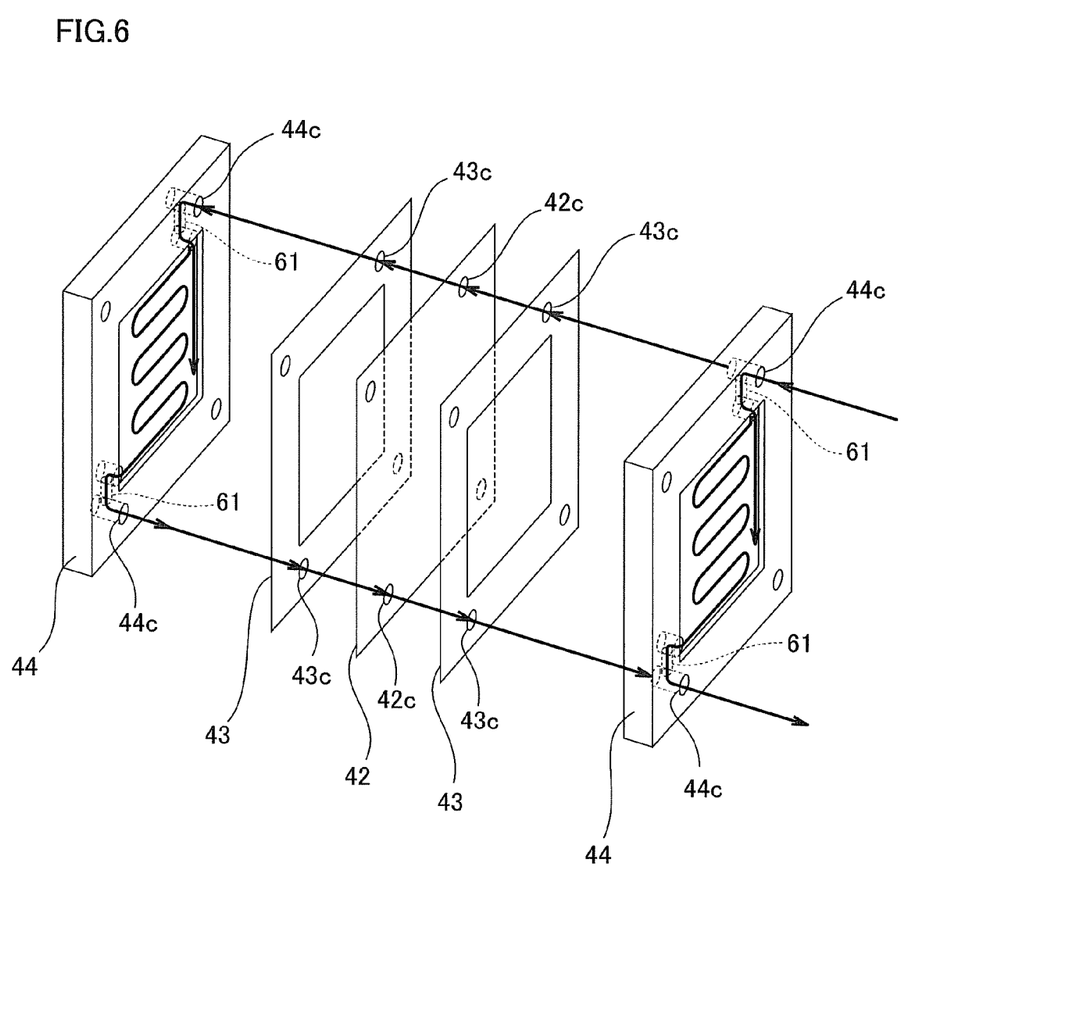
FIG. 6 is a diagram showing the flow of liquid fuel.

FIG. 3 is a perspective view showing the power generation module 14, FIG. 4 is an exploded perspective view of the power generation module 14, FIG. 5 is a perspective view showing the partition plate, and FIG. 6 is a schematic view showing the flow of a liquid fuel. The power generation module 14 is provided with the pair of collection plates 45, a plurality of partition plates 44, and a plurality of electrode assemblies 42. The electrode assembly 42 has a configuration in which an anode-side electrode plate 47 and a cathode-side electrode plate 48 are stacked and bonded, sandwiching an electrolyte film 46. The anode-side electrode plate 47 is a rectangular-shaped electrode plate disposed inside the interior frame of a rectangular-shaped gasket 47a, the cathode-side electrode plate 48 also is a rectangular-shaped electrode plate disposed inside the interior frame of a rectangular-shaped gasket 48a.

The plurality of electrode assemblies 42 of this configuration are sandwiched by the partition plates 44 and connected in series. The electrode assemblies (not shown) that are placed at both ends are sandwiched by partition plates 44, respectively, and are connected to the collection plates 45. The rectangular frame-shaped gasket 43 is sandwiched between the electrode assembly 42 and the partition plates 44 on two sides, respectively, and a fluid-tight state is formed therebetween. The configuration of these parts will be described in detail below.

First, the anode-side electrode plate 47 of the electrode assembly 42 is an electrode plate in which platinum is supported on a sintered compact of particulate powder composed of zeolite, coral sand, and carbon black. The other cathode-side electrode plate 48 is an electrode plate in which ruthenium is supported on a sintered compact of particulate powder composed of zeolite, and carbon black.

Positioning holes 41a, 42a, 43a, 44a pass through and extend in the thickness direction of the fastening plate 41, the electrode assembly 42, the gaskets 43, the partition plates 44, and the collection plates 45 in a pair of corner portions in the diagonal direction of these components. Positioning pins that are not shown are passed through these positioning holes 41a through 44a, and these components are stacked in an aligned state. A plurality of boltholes 41b are formed in the fastening plates 41, and the components are integrated in a stacked state by fastening bolts 49 that are passed through the boltholes.

A pair of liquid-fuel supply ports 41c, 42c, 43c, 44c, 45c that pass through and extend in the thickness direction of one of the fastening plates 41, the electrode assembly 42, the gaskets 43, the partition plates 44, and the collection plates 45 is formed in the other pair of corner portions in the diagonal direction of these components. The liquid fuel is supplied, e.g., via a liquid-fuel supply conduit 50 connected to the liquid-fuel supply ports 41c on an upper side in the exterior surface of one of the fastening plates 41, and is discharged via a liquid-fuel supply conduit 50 connected to the liquid-fuel supply ports 41c on a lower side.

The collection plates 45 have a shape in which a terminal plate region 45d extends upward in a fixed width from one end of an upper end surface of the rectangular main plate member. In the present example, two collection plates 45 have the same shape, and are disposed with opposite orientations.

Next, the configuration of the partition plates 44 will be described with reference to FIGS. 5 and 6. One surface of the partition plate 44 is used as the anode-side surface 51, and in this case, liquid-fuel supply grooves 52 having a constant depth extending in a parallel manner at fixed intervals in which the two ends are in communication are carved inside the exterior peripheral rectangular frame portion having a constant width. The other surface of the partition plate 44 is the cathode-side surface 53, and in this case, air supply grooves 54 having a constant depth formed in a grid shape are formed inside of the exterior peripheral rectangular frame portion having the same constant width.

The same number of air inlet ports 59 is formed in each of the four peripheral end surfaces 55 through 58 of the partition plates 44, and the air inlet ports 59 are in communication with the air supply grooves 54 via air passages 60 formed inside the partition plate. Therefore, outside air is supplied to the air supply grooves 54 of the partition plates 44 via the air inlet ports 59. The air supplied to the air supply grooves 54 of the cathode-side surface 53 of the cathode-side partition plate 44 is supplied to the cathode-side electrode plate 48 of the electrode junction body 42 facing air supply grooves.

The pair of liquid-fuel supply ports 44c that are formed in the partition plate 44 are in communication with the liquid-fuel supply grooves 52 via liquid-fuel passages 61 that are formed inside the partition plate. Therefore, the liquid fuel that is supplied from the liquid-fuel supply conduit 50 of the fastening plate 41 passes through the liquid-fuel supply ports 41c, 45c, 43c, flows into the liquid-fuel supply ports 44c of the partition plate 44, and from here, passes through the liquid-fuel passages 62 inside the partition plate and is supplied to the liquid-fuel supply grooves 52. The electrode junction body 42 is stacked in a fluid-tight state via the gasket 43 on the anode-side surface 51 of the partition plate 44 on which the liquid-fuel supply grooves 52 are formed. Therefore, the liquid-fuel supply grooves 52 are in an airtight state, and liquid fuel is supplied to the anode-side electrode plate 47 of the electrode junction body 42 without leaking to the outside.

At this point, the liquid fuel passes through the liquid-fuel supply ports 44c, 43c, 42c, 43c that are formed in the partition plate 44, the gasket 43, the electrode assembly 42, and the other gasket 43; and is supplied to the liquid-fuel supply port 44c of the next partition plate 44, as shown in FIG. 6. From here, the liquid fuel passes into the internal liquid-fuel passage 61, and is supplied to the liquid-fuel supply grooves 52 of the partition plate 44. The liquid fuel that flows down to the liquid-fuel supply grooves 52 of the partition plate 44 passes through the internal liquid-fuel passage 61, is discharged to the other liquid-fuel supply port 44c, passes therefrom through the liquid-fuel supply ports 43c, 42c, 43c, 44c, and is discharged to the exterior.

In a power generation module 14 of this configuration, the number of electrode assemblies 42 sandwiched between partition plates 44 and gaskets 43 and connected in series may be increased, whereby power-generating capacity can be readily increased.

Figure 7:
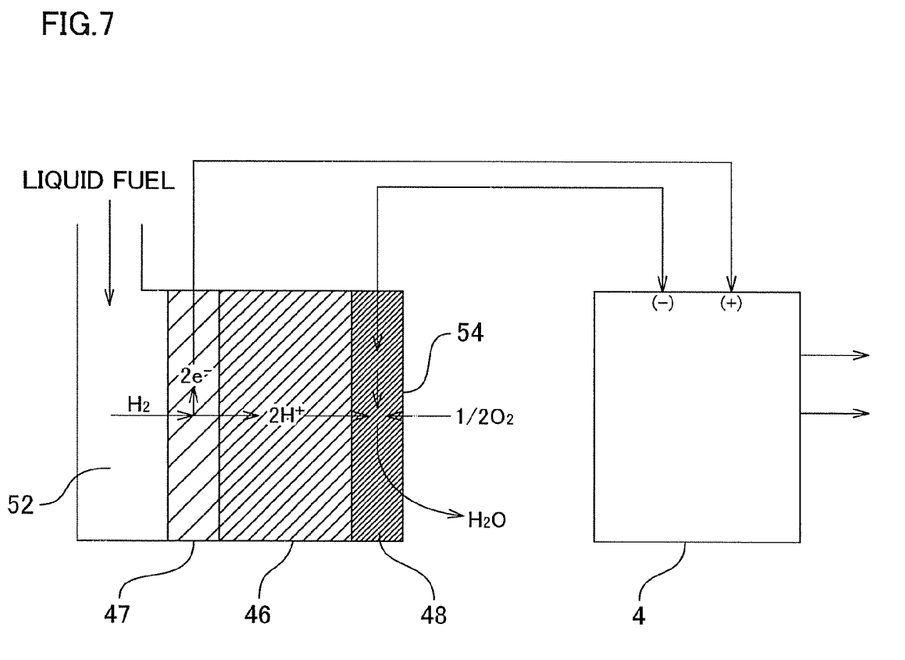
FIG. 7 is a diagram showing the principle of generating power in a power generator module.

The power generation module 14 generates power by an electrochemical reaction between a liquid fuel and a catalyst, and is substantially equivalent to an ordinary fuel cell. In other words, when liquid fuel is supplied to the anode-side electrode plate 47 (the fuel electrode), the fuel is electrolyzed and hydrogen and oxygen are produced, the hydrogen is divided into hydrogen ions and negative electrons by an electrochemical reaction, as shown in FIG. 7. Since hydrogen releases an electron in the reaction, the reaction is an oxidizing reaction. The generated hydrogen ions pass through the electrolyte film 46 (catalyst) of the electrode assembly 42 and migrate to the cathode-side electrode plate 48 (oxygen electrode). The electrolyte film 46 is permeable to ions but blocks electrons, and the negative electrons are therefore removed to the exterior via the collection plate 45 of the anode side. On the other hand, air is fed into the cathode-side electrode plate 48 (oxygen electrode). Therefore, the hydrogen ions supplied along the electrolyte film 46 and electrons supplied from the exterior via the collection plate 45 undergo a reductive reaction, and water is produced. Power is produced thereby. The produced water is recovered together with air in the recovery tank 30 (see FIG. 2).

The drive unit 1 of the present embodiment as constituted above is assembled in a hydraulic working machine so as to drive the hydraulic pump thereof, whereby realizing a low noise working machine. Such a working machine is suited for use in construction work during midnight at a residential or other place, and is also suited for use in work inside a place such as a house, a tunnel or the like where ventilation is insufficient.

Other Embodiments

The drive unit of the present invention can be used as that for driving the electric motor of an electric vehicle. In this case, the drive unit may have the same structure as that shown in FIG. 1, and the output of the electric motor 2 is transferred to a power transmission mechanism that transfers the power to the drive shaft of the drive wheels of the electric vehicle.

As mentioned above, the drive unit according to the present invention is able to use the power generator that has high power-generation efficiency, is small and has high power output in comparison with the conventional fuel batteries, and to drive an electric motor for driving a hydraulic pump, an electric vehicle and other machines. Hence, it is possible to realize a drive unit that is suited for use in the hydraulic pump and that has a low noise level and does not emit exhaust gas. It is also possible to realize a drive unit suited in use for driving the electric motor.

The invention claimed is:

1. A drive unit comprising:
an electric motor; and
a power generator for supplying electric power to the electric motor;
wherein the power generator is provided with a power generator module, a fuel supply component for supplying liquid fuel for hydrogen generation to the power generator module, and an air supply component for supplying air to the power generator module;
wherein the power generator module is structured so that an anode-side electrode plate supplied with the liquid fuel and a cathode-side electrode plate supplied with hydrogen contained in the air are disposed facing each other, an electrolyte film being sandwiched between the electrode plates;
wherein the anode-side electrode plate is an electrode plate in which platinum is supported on a sintered body of a microparticulate powder made of zeolite, coral sand, and carbon black; and
wherein the cathode-side electrode plate is an electrode plate in which ruthenium is supported on a sintered body of a microparticulate powder made of zeolite and carbon black.

2. The drive unit according to claim 1, wherein:
the power generator has a battery for storing electric power generated from the power generation module.

3. The drive unit according to claim 2, wherein:
the power generator module is provided with a pair of collector plates, a plurality of partition plates, and a plurality of electrode assemblies, the electrode assembly is structured so that the anode-side electrode plate and the cathode-side electrode plate are stacked and bonded in which the electrolyte film is sandwiched between them, the electrode assemblies are sandwich the partition plates and are serially connected, the electrode assemblies positioned on both edges are connected to the collector plates in a state in which the corresponding partition plates are sandwiched between the respective electrode assemblies and the collector plates, the partition plate is provided with an anode-side face in which a fuel supply groove is formed, a cathode-side face in which an air supply groove is formed, an external circumferential end face in which an air intake is formed, and a fuel supply port passing in a thickness direction of the corresponding partition plate in an area disposed at a distance from a formation region of the fuel supply groove and the air supply groove, wherein the air intake communicates with the air supply groove via an air duct formed in an interior of the partition plate; and the fuel supply port communicates with the fuel supply groove via a fuel duct formed in the interior of the partition plate, the electrode plates and the collector plates are, respectively, formed with fuel supply ports passing in the thickness direction in an area that corresponds to the fuel supply ports of the partition plates, and the partition plates are stacked while disposed opposite the anode-side face in the anode-side electrode plates of the electrode assemblies, and the partition plates are stacked while disposed opposite the cathode-side face in the cathode-side electrode plates.

4. The drive unit according to claim 3, wherein
the electrode assemblies and the partition plates are stacked with interposed frame gaskets, and
each of the frame gaskets is provided with a fuel supply port passing in a thickness direction of the frame gasket in an area corresponding to the fuel supply port.

5. A hydraulic working machine comprising:
a hydraulic drive mechanism provided with a hydraulic pump; and
a drive unit for driving the hydraulic pump,
wherein the drive unit is that defined by claim 1.

6. An electric vehicle having the drive unit defined by claim 1.

7. A hydraulic working machine comprising:
a hydraulic drive mechanism provided with a hydraulic pump; and
a drive unit for driving the hydraulic pump,
wherein the drive unit is that defined by claim 2.

8. A hydraulic working machine comprising:
a hydraulic drive mechanism provided with a hydraulic pump; and
a drive unit for driving the hydraulic pump,
wherein the drive unit is that defined by claim 3.

9. A hydraulic working machine comprising:
a hydraulic drive mechanism provided with a hydraulic pump; and
a drive unit for driving the hydraulic pump,
wherein the drive unit is that defined by claim 4.

10. An electric vehicle having the drive unit defined by claim 2.

11. An electric vehicle having the drive unit defined by claim 3.

12. An electric vehicle having the drive unit defined by claim 4.

* * * * *